United States Patent
Maloum

(10) Patent No.: US 10,612,988 B2
(45) Date of Patent: Apr. 7, 2020

(54) METHOD FOR ESTIMATING THE TORQUE OF A HEAT ENGINE

(71) Applicants: RENAULT s.a.s., Boulogne-Billancourt (FR); NISSAN MOTOR Co. Ltd., Yokohama-Shi (JP)

(72) Inventor: Abdelmalek Maloum, Chevilly-Larue (FR)

(73) Assignees: RENAULT s.a.s., Boulogne-Billancourt (FR); NISSAN MOTOR Co. Ltd., Yokohama-Shi (JP)

( * ) Notice: Subject to any disclaimer, the term of this patent is extended or adjusted under 35 U.S.C. 154(b) by 225 days.

(21) Appl. No.: 15/321,267

(22) PCT Filed: May 26, 2015

(86) PCT No.: PCT/FR2015/051383
§ 371 (c)(1),
(2) Date: Dec. 22, 2016

(87) PCT Pub. No.: WO2015/197929
PCT Pub. Date: Dec. 30, 2015

(65) Prior Publication Data
US 2017/0205298 A1    Jul. 20, 2017

(30) Foreign Application Priority Data

Jun. 24, 2014   (FR) ..................................... 14 55856

(51) Int. Cl.
| | |
|---|---|
| G01L 3/24 | (2006.01) |
| B60W 20/10 | (2016.01) |
| F02D 41/02 | (2006.01) |
| B60W 40/10 | (2012.01) |
| B60W 40/00 | (2006.01) |

(Continued)

(52) U.S. Cl.
CPC ............. *G01L 3/242* (2013.01); *B60W 20/10* (2013.01); *B60W 40/00* (2013.01);
(Continued)

(58) Field of Classification Search
CPC .................. G01L 3/242; B60W 20/10; B60W 2510/0638; B60W 2510/081;
(Continued)

(56) References Cited

U.S. PATENT DOCUMENTS

| | | |
|---|---|---|
| 2006/0022469 A1 | 2/2006 | Syed et al. |
| 2007/0080538 A1 | 4/2007 | Syed et al. |

(Continued)

FOREIGN PATENT DOCUMENTS

| | | |
|---|---|---|
| FR | 2 944 246 A3 | 10/2010 |
| FR | 2 998 529 A1 | 5/2014 |

OTHER PUBLICATIONS

Adel, 2010, Parallel HEV Hybrid Controller Modeling for Power Management, World Electric Vehicle Journal vol. 4—ISSN 2032-6653, pp. 1-7 (Year: 2010).*

(Continued)

*Primary Examiner* — Lisa E Peters
(74) *Attorney, Agent, or Firm* — Oblon, McClelland, Maier & Neustadt, L.L.P.

(57) ABSTRACT

A method estimates a torque of a heat engine in a vehicle hybrid transmission including at least a heat engine and an electric machine together or separately supplying a heat engine torque and heat engine torque intended for wheels of the vehicle. The method uses a measurement of a speed of the heat engine, a value of the heat engine torque reference, and a value of the electric machine torque. The method also sums an estimate of a total torque supplied by the transmission to the wheels and of an estimate of an equivalent resistive torque of the transmission to determine the estimated heat engine torque.

7 Claims, 1 Drawing Sheet

(51) Int. Cl.
*B60W 20/00* (2016.01)
*B60W 50/00* (2006.01)

(52) U.S. Cl.
CPC ....... *B60W 40/1005* (2013.01); *F02D 41/023* (2013.01); *B60W 20/00* (2013.01); *B60W 2050/0031* (2013.01); *B60W 2050/0041* (2013.01); *B60W 2510/0638* (2013.01); *B60W 2510/0657* (2013.01); *B60W 2510/0695* (2013.01); *B60W 2510/081* (2013.01); *B60W 2510/083* (2013.01); *B60W 2510/105* (2013.01); *B60W 2510/1095* (2013.01); *B60W 2710/0666* (2013.01); *F02D 2200/1004* (2013.01); *Y10S 903/902* (2013.01)

(58) Field of Classification Search
CPC ... B60W 2510/0657; B60W 2510/083; B60W 2510/105; B60W 2710/0666; Y10S 903/902
See application file for complete search history.

(56) References Cited

U.S. PATENT DOCUMENTS

| | | | | |
|---|---|---|---|---|
| 2009/0215586 A1* | 8/2009 | Kresse | ................... | B60K 6/365 477/110 |
| 2010/0057325 A1* | 3/2010 | Livshiz | ................. | F02D 11/105 701/102 |
| 2011/0021310 A1* | 1/2011 | Kresse | ................... | B60L 58/21 477/3 |
| 2013/0151115 A1* | 6/2013 | Lee | ........................ | B60W 20/00 701/102 |
| 2013/0296122 A1* | 11/2013 | Banker | ............... | B60W 10/196 477/5 |
| 2017/0205298 A1* | 7/2017 | Maloum | ............... | B60W 20/00 |

OTHER PUBLICATIONS

Brown, 2013, Introductory Physics I, Elementary Mechanics, Duke University Physics Department, pp. 173-211 & 349-385 (Year: 2013).*
Honeywell, 2000, PID Control, Chapter 8, CalTech, pp. 201-222 (Year: 2000).*
Mapelli, 2012, Modeling of Full Electric and Hybrid Electric Vehicles, chapter 7, InTech, pp. 207-236 (Year: 2012).*
Su, 2010, Design and Analysis of Hybrid Power Systems with Variable Inertia Flywheel, World Electric Vehicle Journal vol. 4—ISSN 2032-6653, pp. 1-8 (Year: 2010).*
International Search Report dated Sep. 8, 2015 in PCT/FR2015/051383 filed May 26, 2015.
French Search Report dated Mar. 31, 2015 in FR 1455856 filed Jun. 24, 2014.

* cited by examiner

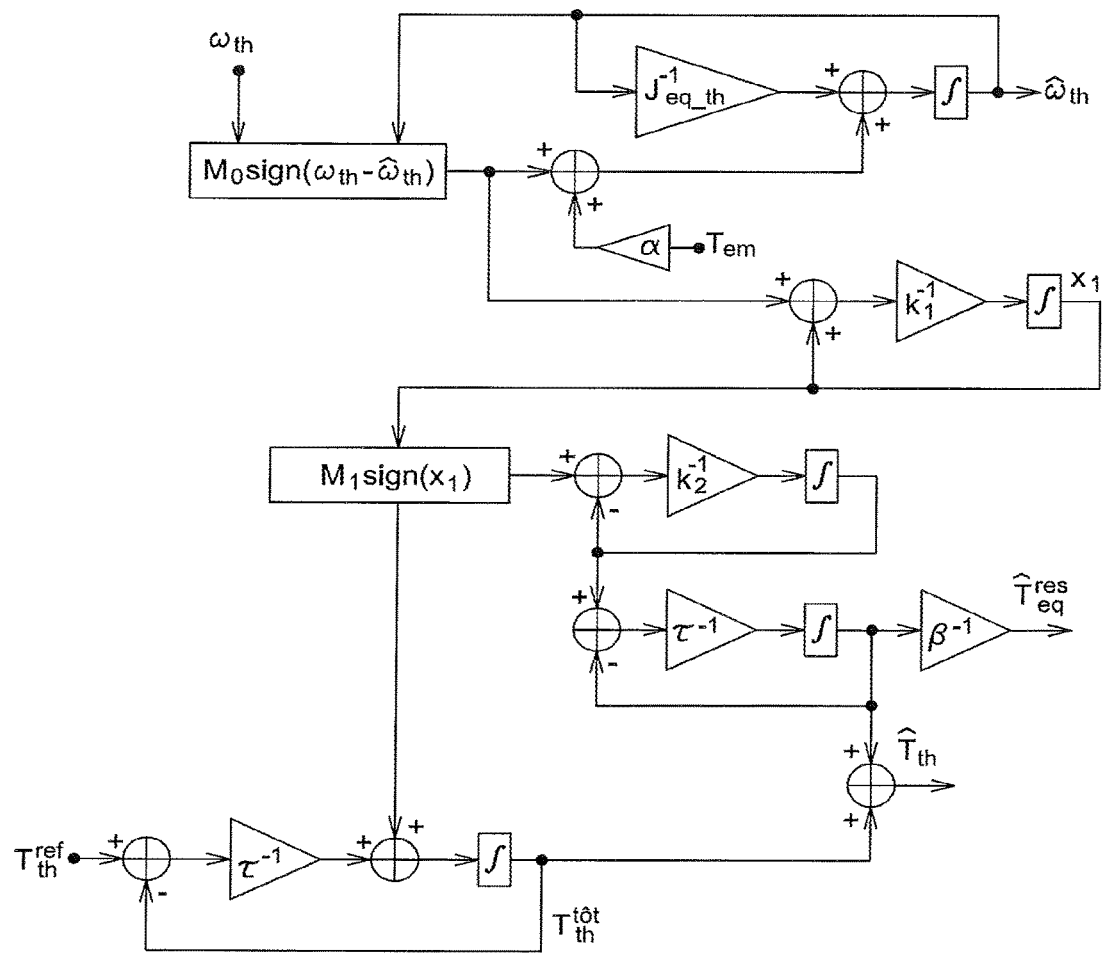

METHOD FOR ESTIMATING THE TORQUE OF A HEAT ENGINE

BACKGROUND

The present invention relates to the field of heat engine control.

More specifically, its subject is a method for estimating the torque of a heat engine in a vehicle hybrid transmission comprising at least a heat engine and an electric machine together or separately supplying a heat engine torque and an electric torque intended for the wheels of the vehicle.

This method can be applied to any heat engine or hybrid powertrain having two rotating shafts (or pinions) that need to be synchronized in order to engage a transmission ratio.

Torque control of a heat engine in a hybrid or non-hybrid vehicle is of capital importance in improving the overall performance of the vehicle and the drivability thereof.

When the gearbox associated with the engine is a parallel shafts gearbox comprising at least a primary shaft connected to a power source and a secondary shaft driven by the primary shaft in order to transmit the motive torque to the wheels, it requires good control over the (heat engine and/or electric) torque in order to avoid potential jerkiness in the torque curve as torque is reapplied after the changes in gear ratio. Control over the motive torque during the changes in gear ratio is of particular importance in certain hybrid architectures in which the synchronizing of the two gearbox shafts, prior to engaging a gear ratio, is assigned to the heat engine.

However, the measurement of the torque of the heat engine is not directly available in a vehicle moving along. One means for obtaining its value is to estimate (reconstruct) it indirectly from measurements of the angular rotational speed of the crankshaft.

Publication FR 2 681 425 discloses a method for measuring the torque of an internal combustion heat engine using the signal produced by a sensor associated with the engine flywheel ring gear. This method makes it possible to calculate the mean torque produced by each combustion of the gaseous mixture in each cylinder of the engine. The calculated values can be used to continuously improve engine operation and monitor defects thereof. The engine management computer is capable of adapting to the empirical measurements taken from the flywheel ring gear. Continuous improvement of combustion performance is performed by loop control of the combustion parameters, this all assuming good knowledge of the dynamics of the combustion systems and the response times thereof.

This method is somewhat unsatisfactory in complex environments such as hybrid architectures, because of the combined effects of the inertias and frictions within the powertrain. Each motive power source, heat engine and electric machine, actually has its own dynamics and its own level of response specific to the control instructions.

When the two shafts (pinions) that are to be coupled are synchronized by way of the heat engine, the latter needs moreover to meet the driver's demand for torque. The control system therefore demands very accurate information regarding the instantaneous value of the heat engine torque. It is notably necessary for the discrepancy in speed between the shafts that are to be synchronized to converge very quickly to a range of 30 revolutions per minute in order for the gearshift to be acceptable, with a speed differential that is as small as possible. The phase that follows on from the coupling of the two shafts (reapplication of torque) also needs to be transparent, which means to say to take place with the least possible amount of jerkiness.

BRIEF SUMMARY

It is an object of the present invention to reconstruct a torque signal produced by the heat engine, taking account of its transmission to the gearshift control members and to the wheels.

In particular, the invention seeks to allow robust control over engine speed during the synchronization phase prior to the engaging of a gear ratio, when this synchronization is performed by the heat engine. The estimated torque signal needs to be sufficiently accurate that gear shifts can be performed in a manner that is transparent to the user.

To this end, the invention proposes to estimate the heat engine torque as being the sum of an estimate of the total torque supplied by the transmission to the wheels, and of an estimate of the overall resistive torque of the transmission.

For preference, this method uses a measurement of the speed of the heat engine, the value of the heat engine torque reference, and the value of the electric machine torque.

BRIEF DESCRIPTION OF THE DRAWINGS

The invention will be better understood from reading the following description of one nonlimiting embodiment thereof and by referring to the attached drawing, the single FIGURE of which illustrates the key steps in the method.

DETAILED DESCRIPTION

By applying the fundamental principle of mechanics to a hybrid powertrain comprising a heat engine and an electric machine, the following dynamic model is obtained:

for the heat engine: $J_{th}\dot{\omega}_{th}=T_{th}-T_{th}^{res}$
for the electric motor: $J_{em}\dot{\omega}_{em}=T_{em}-T_{em}^{res}$
for the wheel: $J_{r}\dot{\omega}_{r}=T_{r}-T_{r}^{res}$ where:
$\omega_{th}$: the speed of the heat engine,
$T_{th}$: the torque of the heat engine,
$T_{th}^{res}$: the resistive torque of the heat engine,
$J_{th}$: the inertia of the heat engine,
$\omega_{em}$: the speed of the electric motor,
$T_{em}$: the motor torque,
$T_{em}^{res}$: the resistive torque of the electric motor,
the inertia of the electric motor,
$\omega_{r}$: the speed of the wheel,
$T_{r}$: the torque applied to the wheel,
$T_{r}^{res}$: the resistive torque applied to the wheel (unknown input of external origin),
$J_{r}$: the inertia of the wheel.

The torque of the heat engine $T_{th}$ is always a response to the driver's torque demand (reference) $T_{th}^{ref}$. If $\tau$ is the symbol used for a time constant of the heat engine ($\tau$ comprised between $\tau_{min}$ and $\tau_{max}$) being indicative of the responsiveness of the heat engine to achieving its torque reference $T_{th}^{ref}$, this can be written:

$$\tau \dot{T}_{th}=T_{th}^{ref}-T_{th}.$$

Whatever the kinematic mode of the transmission, the overall inertia of the powertrain can be referenced to the heat engine by introducing the notions of "equivalent inertia" or "inertia with respect to the heat engine" $J_{eq\text{-}em}$, and of equivalent resistive torque $T_{eq}^{res}$.

The fundamental principle of dynamics, applied to the sum of the driving and resistive torques of the transmission, can be written as follows: $J_{eq\_th}\dot{\omega}_{th}=T_{th}+\alpha T_{em}-\beta T_{eq}^{res}$, where ($\alpha$) and ($\beta$) are dependent on the stepdown gear ratios between the heat engine shaft and the wheels. $\beta$ is dependent in particular on the stepdown gear ratios of the gearbox and on the axle assembly of the vehicle.

From a relationship of this type it is possible to determine the value of equivalent inertia of the transmission with respect to the heat engine $J_{eq-th}$. The equivalent resistive torque may be the resistive torque applied to the wheel $T_r^{res}$ or the resistive torque of the engine or motor. From this equation, the invention proposes constructing an "observer" that makes it possible to establish an estimate of the heat engine speed $\hat{\omega}_{th}$, an estimate $\hat{T}_{th}$ of the torque $T_h$, applied by the heat engine, and an estimate $\hat{T}_{eq}^{res}$ of the equivalent resistive torque $\hat{T}_{eq}^{res}$, guaranteeing the "robustness" of $\hat{T}_{th}$.

The method is illustrated in FIG. 1. It makes it possible to estimate the torque of a heat engine in a vehicle hybrid transmission comprising at least a heat engine and an electric machine together or separately supplying a heat engine torque $T_{th}$ and an electric torque $T_m$ intended for the wheels of the vehicle. The output signals $\hat{\omega}_{th}$, $\hat{T}_{th}$, $\hat{T}_{eq}^{res}$ may be seen in FIG. 1, together with the estimate of the total torque $\hat{T}_{th}^{tot}$. The estimated torque of the heat engine $\hat{T}_{th}$ is the algebraic sum of $\hat{T}_{th}^{tot}$ and of $\hat{T}_{eq}^{res}$. These estimates are produced from just three inputs used by the observer: a measurement of the speed of the heat engine $\omega_{th}$, the value of the heat engine torque reference $T_{th}^{ref}$, and the value of the electric machine torque $T_{em}$.

$M_0$, $M_1$, $k_1$ and $k_2$ are the gains that need to be calibrated. A first gain $M_0$ or "drift compensation" is assigned the sign of the difference ($\omega_{th}-\hat{\omega}_{th}$) to be added to the product $\alpha \cdot T_{em}$. This sum is integrated in order to give the estimate $\hat{\omega}_{th}$ of the engine speed with loop correction by the product of the integration with the inverse of the equivalent inertia $J_{eq-th}$. The term $M_0$ assigned the sign of ($\omega_{th}-\hat{\omega}_{th}$) is multiplied by the inverse of the gain $k_1$. This product is integrated, then corrected with the result of the integration $x_1$. To sum up, an estimate $\hat{\omega}_{th}$ of the engine speed is obtained from its measurement $\omega_m$ by integrating the sum of the product $\alpha \cdot T_{em}$ and of the calibrated gain $M_0$ assigned the sign of the difference $\omega_{th}-\hat{\omega}_{th}$.

The sign of $x_1$ is imposed on the second gain $M_1$, used to calculate the torque estimates $\hat{T}_{th}^{tot}$, $\hat{T}_{th}$ and $\hat{T}_{eq}^{res}$ in the subsequent steps. The term $M_1 \cdot sign(x_1)$ is added to the torque reference $T_{th}^{ref}$ to give, through integration, the estimate of the total torque $\hat{T}_{th}^{tot}$. This undergoes double integration after having been multiplied in succession by the inverse of the gain $k_2$ and by the inverse of the engine time constant $\tau$. The estimate of the equivalent resistive torque $\hat{T}_{eq}^{res}$ is obtained by multiplying the result by the inverse of the parameter $\beta$ mentioned above. As indicated in the figure, the estimate of the heat engine torque $\hat{T}_{th}$ is the sum of the estimate of the total torque $\hat{T}_{th}^{tot}$ and of the equivalent resistive torque $\hat{T}_{eq}^{res}$.

The proposed method for estimating the torque thus breaks down into two main phases:

a first phase that involves estimating the speed of the heat engine $\hat{\omega}_{th}$, the total applied torque $\hat{T}_{th}^{tot}$ and the equivalent resistive torque $\hat{T}_{eq}^{res}$, and a second phase that involves estimating the applied torque of the heat engine $\hat{T}_{th}$ from the total applied torque $\hat{T}_{th}^{tot}$ and from the equivalent resistive torque $\hat{T}_{eq}^{res}$.

In order to estimate the speed of the heat engine $\hat{\omega}_{th}$, the total applied torque $\hat{T}_{th}^{tot}$ and the equivalent resistive torque $\hat{T}_{eq}^{res}$, the observer has available to it only the heat engine speed measurement $\omega_{th}$, the torque reference $T_{th}^{ref}$ and the electric machine torque $T_{em}$.

In the second step, the equivalent resistive torque $\hat{T}_{eq}^{res}$ is multiplied by the parameter $\beta$.

In conclusion, the invention proposes a robust method for estimating the torque for a vehicle equipped with a heat engine or hybrid powertrain. The observer allows the applied torque of the heat engine $\hat{T}_{th}$, the total applied torque $\hat{T}_{th}^{tot}$ and the equivalent resistive torque $\hat{T}_{eq}^{res}$ to be estimated. This estimation makes it possible for the next step, that of coupling the two shafts (reapplication of torque or torque switchover) to be rendered transparent, thereby considerably reducing the jerkiness of the torque curve. The method notably allows better control over how well the torque curve is followed while two shafts are being synchronized, by means of the heat engine. Finally, the convergence of the estimated speed $\hat{\omega}_{th}$ onto the measured speed $\omega_{th}$ is somewhat insensitive to variations in the parameters of the system, such as the inertia and response time of the actuator, or any lags there might be, so that this observer is particularly robust.

The invention claimed is:

1. A method for controlling a torque of a heat engine of a vehicle hybrid transmission including at least the heat engine and an electric machine supplying a torque of the heat engine and the electric machine to wheels of the vehicle, comprising:

measuring a speed of the heat engine, a reference torque of the heat engine, and the torque of the electric machine;

estimating a total torque supplied by the transmission;

estimating an equivalent resistive torque of the transmission to obtain an estimated equivalent resistive torque of the transmission, wherein the estimated equivalent resistive torque of the transmission is obtained by assigning a gain $M_1$ a sign of an integration $x_1$ and then multiplying by an inverse of a gain $k_2$, then integrating, then multiplying by an inverse of an engine time constant $\tau$, then integrating, then multiplying by a parameter $\alpha$, the parameter $\alpha$ being dependent on stepdown gear ratios of a gearbox and an axle assembly of the vehicle;

estimating the torque of the heat engine by summing the estimated total torque supplied by the transmission and the estimated equivalent resistive torque of the transmission; and controlling the torque of the heat engine based on the estimated torque of the heat engine and the reference torque of the heat engine.

2. The method for controlling the torque of the heat engine as claimed in claim 1, wherein a transmission equivalent inertia with respect to the heat engine is determined from a relationship of the type $$J_{eq\_th}\dot{\omega}_{th}=T_{th}+\alpha T_{em}-\beta T_{eq}^{res}, \text{ where}$$

a parameter $\alpha$ is dependent on stepdown gear ratios between a heat engine shaft and the wheels, $T_{th}$ is the torque of the heat engine, $T_{em}$ is the torque of the electric machine, $\omega_{th}$ is the speed of the heat engine, $T_{eq}^{res}$ is the equivalent resistive torque of the transmission, and $J_{eq-th}$ is the transmission equivalent inertia with respect to the heat engine.

3. The method for controlling the torque of the heat engine as claimed in claim 2, wherein an estimate of the speed of the heat engine is obtained from an integrated term, the integrated term being an integration of the torque of the electric machine multiplied by the parameter $\alpha$, and a drift compensation being assigned a sign of a difference of the measurement of the speed of the heat engine and the estimate of the speed of the heat engine.

4. The method for controlling the torque of the heat engine as claimed in claim 3, wherein the integrated term is corrected in a loop by an inverse of the transmission equivalent inertia with respect to the heat engine.

5. The method for controlling the torque of the heat engine as claimed in claim 3, wherein the drift compensation assigned the sign of the difference of the measurement of the speed of the heat engine and the estimate of the speed of the heat engine is multiplied by the inverse of a gain $k_1$, and corrected with a result of the integration $x_1$.

6. The method for controlling the torque of the heat engine as claimed in claim 5, wherein the estimate of the total torque is obtained by integrating the reference torque of the heat engine and the gain $M_1$ assigned the sign of the integration $x_1$.

7. A method for controlling a torque of a heat engine of a vehicle hybrid transmission, comprising:

measuring a speed of the heat engine, a reference torque of the heat engine, and a torque of an electric machine;

estimating a total torque supplied by the transmission, an equivalent resistive torque of the transmission, and a speed of the heat engine, wherein the estimated speed of the heat engine is corrected in a loop by an inverse of a transmission equivalent inertia with respect to the heat engine, and wherein the estimated equivalent resistive torque of the transmission is obtained by assigning a gain $M_1$ a sign of an integration $x_1$ and then multiplying by an inverse of a gain $k_2$ then integrating, then multiplying by an inverse of an engine time constant $\tau$, then integrating, then multiplying by a parameter $\beta$, the parameter $\beta$ being dependent on stepdown gear ratios of a gearbox and an axle assembly of the vehicle;

estimating the torque of the heat engine by summing the estimated total torque supplied by the transmission and the estimated equivalent resistive torque of the transmission; and controlling the torque of the heat engine based on the estimated torque of the heat engine.

\* \* \* \* \*